Patented July 8, 1952

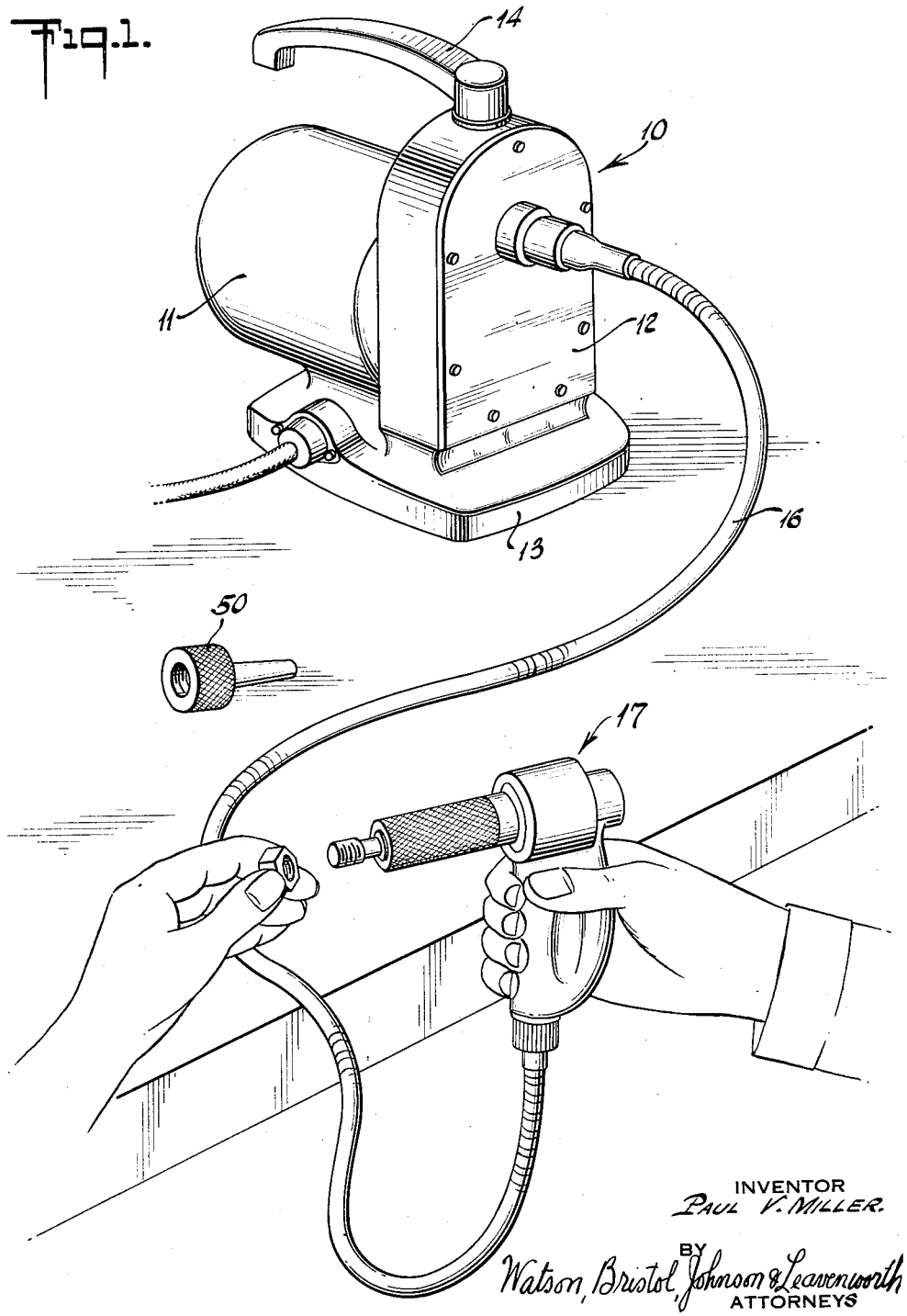

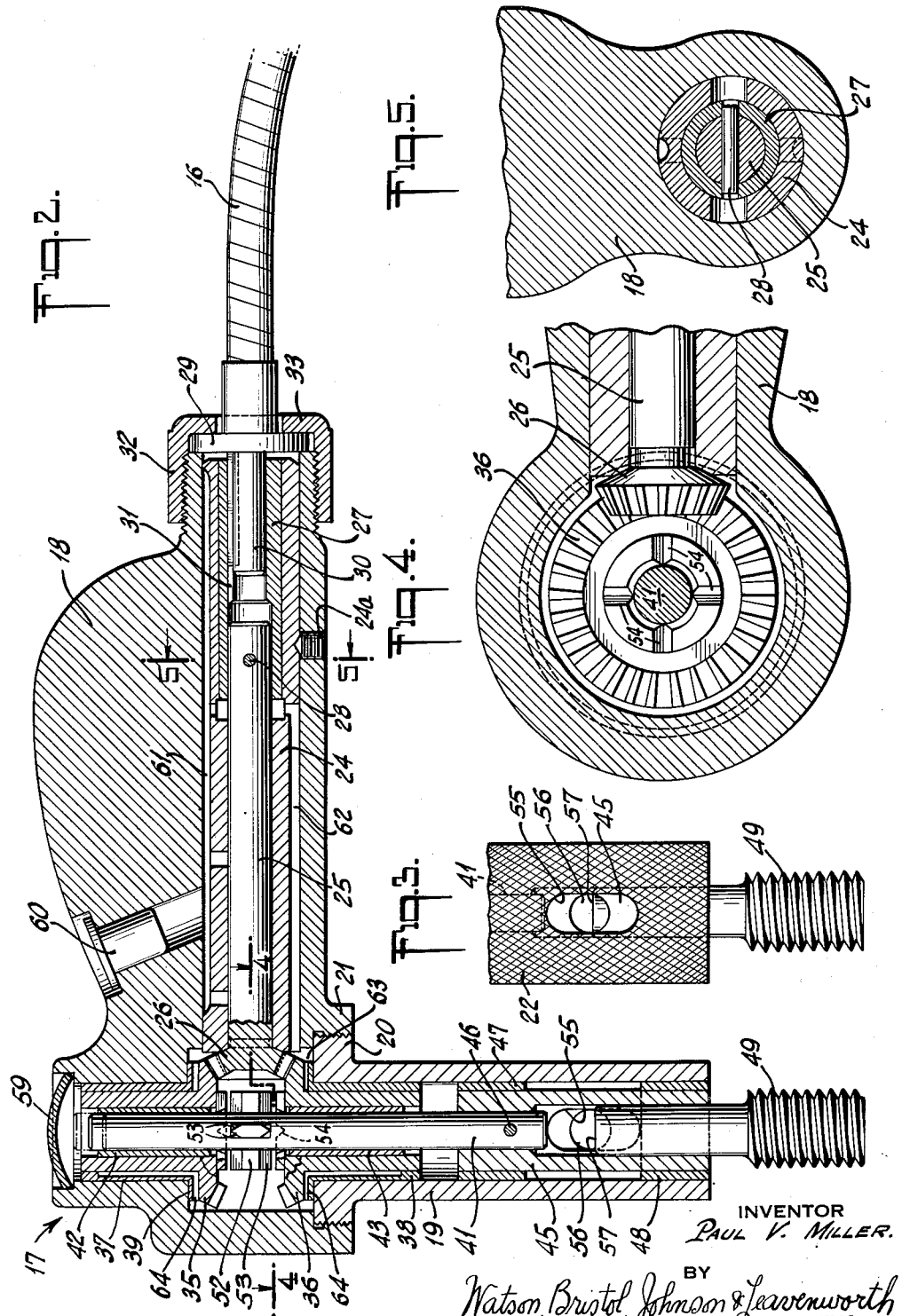

2,602,347

UNITED STATES PATENT OFFICE 2,602,347

THREAD GAUGE DRIVE

Paul V. Miller, Woonsocket, R. I., assignor to The Taft-Peirce Manufacturing Company, Woonsocket, R. I., a corporation of Rhode Island Application April 23, 1949, Serial No. 89,359

3 Claims. (Cl. 74—378)

The invention is concerned with a portable power driven thread gage and particularly with a device of such character embodying features which cooperate to result in a thread testing means which is light weight, simple and compact yet easy and non-tiring to operate, requiring but little manual effort. The device functions to enable an operator to test threaded articles at a rapid rate and without danger of injury to the operator. Apart from the operating characteristics the simplicity and general arrangement enables the component parts to be economically manufactured and assembled.

The above indicates some of the general objects and characteristics of the device. The more detailed arrangement and other advantages will be particularly described or be made evident hereinafter.

The invention accordingly comprises the features of construction, combination of elements, and arrangement of parts, which will be exemplified in the construction hereinafter set forth, and the scope of the invention will be indicated in the claims.

Reference should now be had to the following detailed description taken in connection with the accompanying drawing, in which:

Fig. 1 is a general assembly view in perspective of the complete thread gage;

Fig. 2 is a cross sectional view of the operating head showing the internal mechanism;

Fig. 3 is a fragmentary view of the spindle end of the operating head;

Fig. 4 is a cross sectional view taken on the line 4—4 of Fig. 2 but drawn to an enlarged scale; and Fig. 5 is an enlarged cross sectional view taken on the line 5—5 of Fig. 2.

Referring first to Fig. 1, it will be seen that the general components of the device include a power unit 10 which embodies an electric motor 11, a suitable reduction gear mechanism contained in the housing portion 12 the details of which may be of any conventional form and are not therefore disclosed. The power drive unit includes a supporting base 13 and a handle 14 whereby it may be readily carried from place to place. As will appear the device as a whole is very light weight and requires a very little power and accordingly the motor 11 may be of a fractional horse power as, for example, 1/20 H. P.

Leading from the power unit 10 is a flexible power cable 16 designed to supply rotary power to the operating head 17 the details of which will now be more fully described by reference to Figure 2 and the related cross sectional views.

The portable head includes a housing portion 18 which is externally shaped to form a convenient hand grip and a second housing portion 19 extending at right angles to the hand grip portion and suitably connected thereto. The connecting means may be of any desired type but as a practical matter is here shown as comprising a screw threaded means the sleeve portion 19 being provided with an enlarged flange 20 having external threads adapted to be received in an internally threaded boss 21 of the handle portion 18. The enlarged opening also provides a means for the ready insertion or removal of the reversible clutch gears and associated mechanism to be described. The housing or sleeve 19 is provided with an outer knurled surface 22 to assist in manually screwing it into the housing portion 18.

The hand grip portion 18 is provided with a long bushing 24 within which a shaft 25 rotates, the inner end of the shaft being provided with a bevel gear 26 integral with or secured on the shaft. The bushing 24 is secured in position by a set screw 24a. The outer end of bushing 24 is counterbored to a suitable depth to receive a sleeve 27 secured to the shaft 25 by means of a pin 28. The internal rotary element of the flexible drive shaft 16 terminates in an element having a flange 29 and projecting pin 30 the pin being provided with a key longitudinally slidable into the key way 31 of the sleeve 27 whereby rotary motion is imparted to the sleeve 27 and in turn to the shaft 25 and bevel gear 26.

The flexible drive shaft 16 is readily assembled to the operating head through the sliding key connection and is secured thereto by means of the nut 32 threaded over the outer end of the hand grip portion 18 and arranged so that the flange portion 29 rotates in an annular space between the outer end of the hand grip portion 18 and the flange portion 33 of the nut 32. The nut 32 may be suitably knurled on its external surface for ready manual assembling.

Mounted in the operating head are a pair of opposed bevel gears 35 and 36 adapted to be driven by the common bevel gear 26. Each of the bevel gears has an extending sleeve portion adapted to be rotatably supported in suitable bushings 37 and 38 respectively. The bushing 37 has a flange portion 39 and the bushing 38 a corresponding flange portion adapted to serve as thrust bearing surfaces for the respective bevel gears. Coaxially mounted within the bevel gears 35 and 36 is a spindle shaft 41. Preferably bearing bushings are provided for the spindle shaft within the bevel gears as shown at 42 and 43 respectively, the bushings having a press fit in the corresponding sleeve portions of the bevel gears. Secured to the outer end of the spindle shaft 41 is a spindle sleeve 45 as by means of the pin 46. Suitable bearing supports are provided for the sleeve 45 comprising, as shown, spaced bushings 47 and 48 which may have a press fit in the housing portion 19. The outer end of the sleeve 45 is provided with a tapered opening to receive the shank of a thread gage such as the male gage 49 shown in Figs. 2 and 3. The device is, of course, adapted to operate other elements which may be assembled in the sleeve 45 for that purpose and particularly may be used to operate a female thread gage such as indicated generally at 50 in Figure 1.

The spindle including the spindle shaft 41 and the sleeve 45 are adapted both to rotate and to slide axially within the housing portion 19, the axial movement effecting selective engagement of the reversible clutch means for rotation of the spindle in one direction or the other, the details of which reversible clutch means will now be described.

Formed integrally on or secured on the spindle shaft 41 are male clutch elements comprising four uniformly spaced radial fingers 52 provided with beveled or V-shaped tooth portions 53; and the bevel gears 35 and 36 are each provided with complementary female formations comprising, as shown, V-shaped notches 54 in the respective end surfaces facing the male clutch elements 52.

As described, the interengaging surfaces are beveled or V-shaped whereby they will readily interengage upon axial shifting of the spindle 41 while the bevel gears 35 and 36 are being continuously rotated. Also, and of particular importance, it will be seen that by reason of the shape of the engageable clutch elements the drive connection will be of an impositive type whereby if the resistance at the thread gage exceeds a certain value dependent upon the axial force applied, the spindle clutch element will be cammed out of engagement with the corresponding depressions of the corresponding female drive clutch element. It will be understood that the device disclosed is intended particularly for manual operation in which the operator grips in one hand the power head in some such manner as that shown in Figure 1 and applies with the other hand a nut to the outer end of the thread gage and automatically shifts the spindle inwardly causing it to be rotated through the bevel gear 35. If and when the nut is sufficiently advanced on the gage, the operator gently pulls outwardly on the nut causing engagement with the clutch gear 36 and reversal of the direction of rotation of the spindle and the nut to travel off the gage. The operator is free to determine the amount of the torque applied to the nut, the torque being substantially in proportion to the amount of axial force exerted by the operator between the nut and the spindle. In cases where the threads of the nut are undersize and become excessively tight or an obstruction is met, the operator merely governs the amount of axial force exerted and release of the drive occurs automatically without turning of the nut in the operator's hand.

The angle applied to the tooth surfaces 53 and correspondingly the notches 54 may be varied, but it has been found that an included angle of 60° is quite satisfactory. By included angle is meant the angle between the two bevel surfaces 53 as they appear, for example, in the end view of the middle tooth 52 in Figure 2. The positions of the male and female clutch elements may of course be reversed. Also the projecting teeth 52 and the notches 54 need not necessarily be V-shaped since it is sufficient if the complementary or engaging surfaces are beveled on the corresponding sides which engage in the respective driving direction.

Removal of the thread gage from the spindle sleeve 49 is facilitated in the present device by the provision of means enabling the use of a drift pin, such means comprising a pair of diametrically opposed slots 55 in the housing portion 19 and a pair of diametrically opposed holes 56 in the sleeve 49 arranged to coincide with the slots 55 when the sleeve is rotated into appropriate position whereupon a drift pin may be driven into the openings effecting a wedging action against the inner end 57 of the thread gage to loosen the taper fit thereof.

Access to the clutch means and associated elements may be easily had by unscrewing the housing portion 19 whereupon the spindle assembly including the bevel gear 36 may be withdrawn as a unit.

As a manufacturing convenience the bore in housing portion 18 for the bearing sleeve of bevel gear 35 and its bushing 37 extends out to the exterior in which case a suitable outer closure is provided such as an expansion plug 59.

The entire operating mechanism in the operating head 17 is lubricated from a single point of application comprising a grease gun fitting 60 from which lubricant extends to all bearing parts the details of which may be seen in Fig. 2 and which include the longitudinal grooves 61 and 62 in bushing 24 from where lubricant may flow into the annular chamber 63 and then into radial grooves 64 in the end bearing faces of the bushings 38 and 39 and to other desired points through appropriate passages which are shown or may be provided.

As has been described the power drive includes a speed reduction means indicated at 12 whereby an appropriate speed is obtained at the thread gage such as approximately four revolutions per second. The device as a whole weighs only a few pounds and may be easily carried about and the operating head 17 is particularly lightweight and may be easily supported and freely manipulated with one hand.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. A power driven thread gage comprising a light weight unsupported operating head freely movable manually in all directions having a housing provided with a hand grip for manually supporting the head, a pair of driving clutch members adapted to rotate in opposite directions arranged in opposed relation in said housing, a portable drive motor adapted to be supported separately from said operating head, a flexible drive shaft extending from said motor to said housing, a connection in said housing for driving said driving clutch members from said flexible drive shaft, an axially shiftable spindle mounted coaxially with and extending through said driving clutch members, and means for removably supporting a thread gage on the outer end of said spindle, said spindle having thereon driven clutch means selectively engageable with said driving clutch members by axial shifting of said spindle the driving connection comprising complementary beveled cam like surfaces adapted thereby to provide an impositive drive, the effective torque required to advance or retract the gage on its helix being controlled by the application of axial force on the spindle by the operator in amount and direction appropriate to the conditions of the article being gaged, and said bevel surfaces serving to cam said driven clutch means into neutral position when said spindle is free of axial force.

2. A power driven thread gage comprising an operating head, a pair of driving clutch members adapted to rotate in opposite directions arranged in opposed relation in said head, a power drive motor, a connection for driving said driving clutch members from said motor, an axially shiftable spindle mounted coaxially with and extending through said driving clutch members, and means for removably supporting a thread gage on the outer end of said spindle, said spindle having thereon driven clutch means selectively engageable with said driving clutch members by axial shifting of said spindle, the connection to said driven clutch means comprising complementary beveled cam like surfaces adapted thereby to provide an impositive drive, the effective torque required to advance or retract the gage on its helix being controlled by the application of axial force on the spindle by the operator in amount and direction appropriate to the conditions of the article being gaged, and said bevel surfaces serving to cam said driven clutch means into neutral position when said spindle is free of axial force.

3. In a power driven thread gage, an operating head, a pair of rotatable bevel gears arranged in said head in opposed relation, a common drive gear meshing with said pair of gears to rotate the latter in opposite directions respectively, a power means connected to drive said common drive gear, an axially shiftable spindle mounted in said head extending coaxially of said pair of gears, means for removably supporting a thread gage in an outer end of said spindle, and clutch means for selectively rotating said spindle by axial adjustment thereof from either of said pair of gears including a driven element rigid on said spindle and driving elements rigid respectively with each of the gears of said pair the driving connections comprising complementary interengaging beveled tooth surfaces adapted thereby to provide an impositive drive the effective torque being in proportion to the amount of axial force applied in the respective axial direction, and said beveled tooth surfaces serving to cam said driven element into neutral position when said spindle is free of axial force.

PAUL V. MILLER.

REFERENCES CITED

The following references are of record in the file of this patent:

UNITED STATES PATENTS

| Number | Name | Date |
|---|---|---|
| 392,610 | Hoffman | Nov. 13, 1888 |
| 803,565 | Dina | Nov. 7, 1905 |
| 1,071,216 | Dilg | Aug. 26, 1913 |
| 1,170,171 | Lane | Feb. 1, 1916 |
| 1,180,074 | Peremi | Apr. 18, 1916 |
| 1,571,773 | Force | Feb. 2, 1926 |
| 1,880,405 | Broecker | Oct. 4, 1932 |
| 2,006,913 | Conley | July 2, 1935 |
| 2,110,469 | Nardone | Mar. 8, 1938 |
| 2,128,715 | Reich | Aug. 30, 1938 |
| 2,192,439 | Gustafson | Mar. 5, 1940 |